(12) United States Patent
Davies et al.

(10) Patent No.: US 10,066,683 B2
(45) Date of Patent: Sep. 4, 2018

(54) CLUTCH FOR A WINCH

(71) Applicant: Goodrich Corporation, Charlotte, NC (US)

(72) Inventors: Stephen H. Davies, Shrewsbury (GB); Bejan Maghsoodi, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 581 days.

(21) Appl. No.: 14/683,393

(22) Filed: Apr. 10, 2015

(65) Prior Publication Data

US 2016/0298705 A1 Oct. 13, 2016

(51) Int. Cl.
| | | |
|---|---|---|
| *B66D 1/16* | (2006.01) | |
| *F16D 43/21* | (2006.01) | |
| *F16D 7/02* | (2006.01) | |
| *F16D 23/12* | (2006.01) | |

(52) U.S. Cl.
CPC ............. *F16D 43/215* (2013.01); *B66D 1/16* (2013.01); *F16D 7/027* (2013.01); *F16D 43/216* (2013.01); *F16D 2023/123* (2013.01)

(58) Field of Classification Search
CPC ....... B66D 1/16; F16D 43/215; F16D 43/216; F16D 7/027
See application file for complete search history.

(56) References Cited

U.S. PATENT DOCUMENTS

| | | | | |
|---|---|---|---|---|
| 3,511,349 A | | 5/1970 | Herscovici | |
| 3,596,740 A | * | 8/1971 | Nau | F16D 43/216 188/134 |
| 3,697,049 A | * | 10/1972 | Wallace | B66D 1/16 192/85.37 |
| 3,797,614 A | * | 3/1974 | McCay, Jr. | F16D 63/00 188/134 |
| 4,118,013 A | * | 10/1978 | Christison | B66D 5/14 192/223.2 |
| 4,545,470 A | | 10/1985 | Grimm | |
| 4,625,843 A | * | 12/1986 | Maltby | F16D 43/216 188/134 |
| 4,898,265 A | * | 2/1990 | Metcalf | F16D 43/216 188/134 |
| 2001/0008853 A1 | * | 7/2001 | Harvey | F16D 7/027 464/36 |
| 2005/0153807 A1 | * | 7/2005 | Puiu | F16D 43/216 475/88 |
| 2009/0301836 A1 | * | 12/2009 | Murakami | F16D 7/027 192/56.62 |
| 2011/0308906 A1 | | 12/2011 | Lafitte | |

(Continued)

FOREIGN PATENT DOCUMENTS

FR 2170324 A5 9/1973

OTHER PUBLICATIONS

European Search Report for Application No. 16164503.1-1756, dated Sep. 14, 2016. 7 Pages.

*Primary Examiner* — Emmanuel M Marcelo
(74) *Attorney, Agent, or Firm* — Cantor Colburn LLP

(57) ABSTRACT

A clutch for driving a winch is provided. The clutch comprises an input shaft for connection to a drive means, operatively connected to at least one input friction plate to rotate therewith and an output shaft for driving a winch operatively connected to at least one output friction plate to rotate therewith.

10 Claims, 2 Drawing Sheets

(56) References Cited

U.S. PATENT DOCUMENTS

2013/0062886 A1\* 3/2013 Fujiwara ............... F16D 7/10
290/1 C
2013/0313067 A1\* 11/2013 Finney ............... F16H 35/10
192/223.2

\* cited by examiner

CLUTCH FOR A WINCH

The present disclosure relates to a clutch for a winch.

BACKGROUND

When using a winch to raise a payload, a winch cable is attached to a motor-driven drum at one end and the payload at the other. The motor is driven to rotate the drum in order to gather up the winch cable on the outer circumference of the drum. A clutch is provided to transmit torque from the motor to the drum. The clutch allows the setting of a maximum torque above which the clutch will slip. When the clutch slips, this effectively disconnects the drum from the motor. This disconnection function prevents an overload experienced at the payload from damaging the winch or a structure to which it is attached (e.g. an airframe). The maximum torque setting of the clutch relies on the degree of bias acting on the plates of the clutch and the coefficient of friction between the plates, as understood by one skilled in the art. Unfortunately, it has been found that current clutches can exhibit unacceptable variation in the friction properties between clutch plates during use, which may prevent slipping at a desired maximum transmitted torque setting or allow premature slipping, before the maximum transmitted torque setting is reached.

A means for setting the maximum transmitted torque is therefore needed to improve on current winch clutch design and increase reliability, safety and stability.

SUMMARY

From one aspect, the present disclosure provides a clutch for driving a winch. The clutch comprises an input shaft, an output shaft and biasing means. The input shaft is configured for connection to a drive means and is operatively connected to at least one input friction plate to rotate therewith. The output shaft is configured for driving a winch and is operatively connected to at least one output friction plate to rotate therewith. The biasing means is arranged to provide a biasing force that pushes the at least one input friction plate and the at least one output friction plate into contact with each other so that torque can be transferred from the input shaft to the output shaft via the input and output friction plates. The clutch further comprises one or more ball-ramp assemblies positioned between the input shaft and the at least one input friction plate.

It should be understood that there may be intervening members between the ball-ramp assembly or assemblies and the input shaft and input friction plate(s), respectively. In other words, the ball-ramp assembly is not necessarily directed connected to the input shaft and the input friction plate(s), all that is necessary is that the parts are operatively connected to each other.

The one or more ball-ramp assemblies may comprise a ball-ramp flange disposed between the input shaft and the input friction plates, and operatively connected to the input friction plates and a ball disposed between the ball-ramp flange and the input shaft, and held in opposing recesses therein. The ball providing an axial separation between the ball-ramp flange and the input shaft.

The recesses may each comprise camming surfaces that are arranged to allow the separation between the input shaft and ball-ramp flange to be varied.

The ball-ramp assembly may be configured such that a predetermined relative torque between the input shaft and output shaft causes the ball to roll along the camming surfaces of the recesses and to increase the separation between the input shaft and the ball-ramp flange.

The increase in separation between the input shaft and the ball-ramp flange may oppose the biasing force between the at least one input friction plate and the at least one output friction plate.

The biasing means may comprise one or more springs, such as one or more disc springs positioned around the output shaft. For example, there may be three disc springs.

Alternatively, other biasing means could be used such as an elastomeric block or a hydraulic arrangement.

The at least one input friction plate may comprise a plurality of input friction plates and the at least one output friction plate may comprise a plurality of output plates.

The clutch may be a wet-type clutch, and may further comprise at least one seal arranged to retain a fluid around at least one portion of the clutch, such as the input and output friction plates.

The retained fluid may be oil or any other suitable fluid known to one skilled in the art, e.g. a cooling fluid or lubricant.

From another aspect, the present disclosure provides a winch system comprising a clutch as described above (in any embodiment), a motor operatively connected to the input shaft and a drum operatively connected to the output shaft.

BRIEF DESCRIPTION OF THE DRAWINGS

Exemplary embodiments and features of the present disclosure will now be described by way of example only, and with reference to FIGS. 1 to 3, of which.

DETAILED DESCRIPTION

Figure 1:
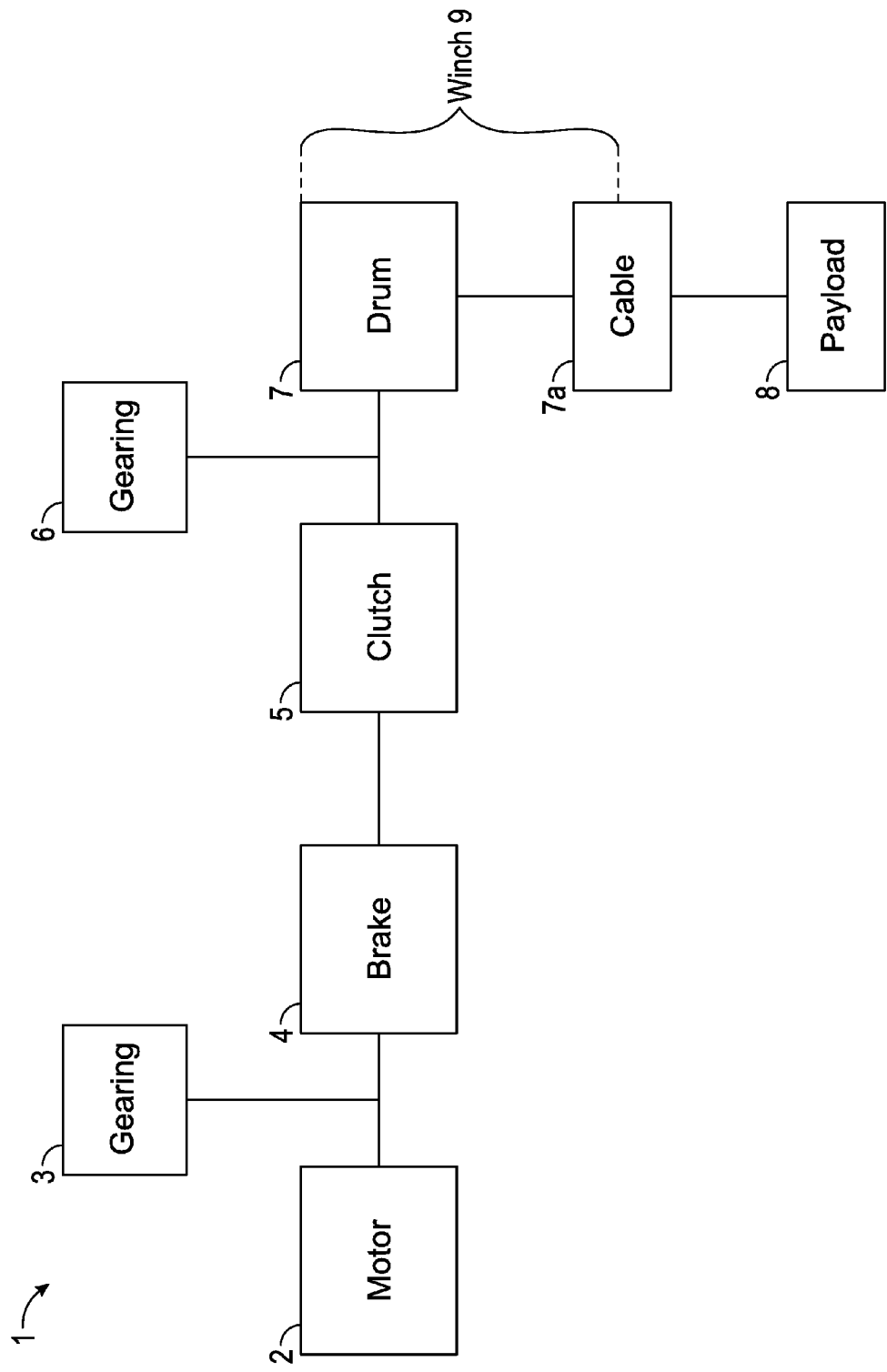
FIG. 1 is an overview of a winch system, in accordance with the present disclosure.

FIG. 1 shows an overview of a typical winch system 1, as is known in the art. A driving means, such as a motor 2, is operatively connected to a brake 4 through gearing 3, which is operatively connected to clutch 5, which is operatively connected to drum 7 through gearing 6. The motor 1 is activated to provide drive to the drum 7 through the gearing 3, brake 4, clutch 5 and gearing 6, in order to wind up (or release) a winch cable 7a to lift (or drop) a payload 8. The drum 7 and cable 7a together form a winch 9. The brake 4 is provided as a means to stop cable winding without disengaging motor 1, whereas clutch 5 acts as a moderating means for the drive, allowing the drum 7 to be disconnected from the motor 2 should the drum 7 become overloaded.

Figure 2:
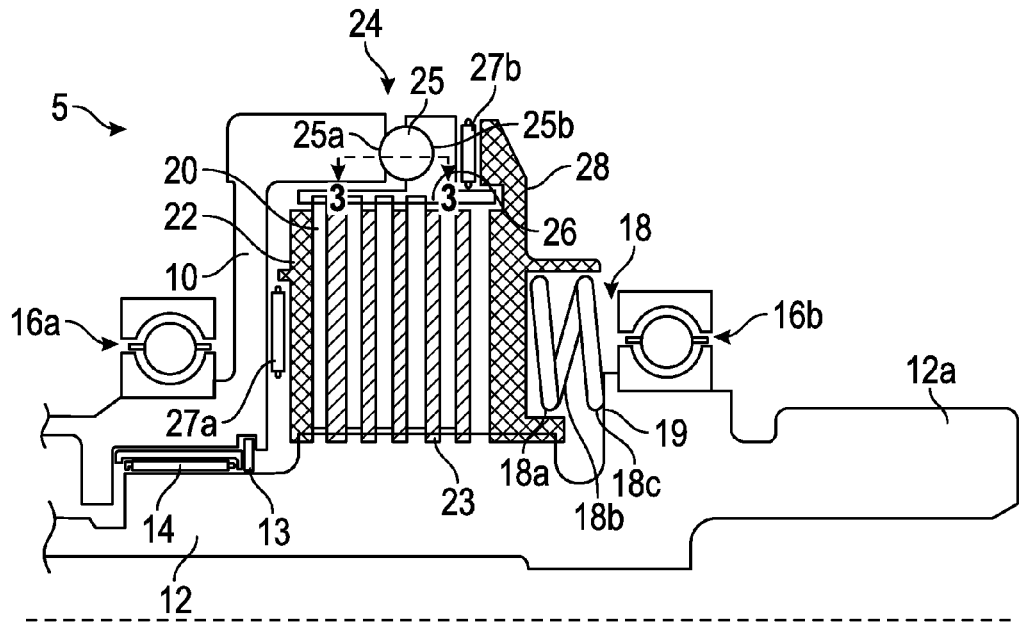
FIG. 2 is a part cross-sectional view of a clutch for a winch system, in accordance with the present disclosure.

FIG. 2 shows a part cross-section of clutch 5. It is to be understood that this is only a part cross-section, and the components shown will be mirrored across an axis of rotation X of the clutch 5, as will be understood by one skilled in the art.

As shown in FIG. 2, the clutch 5 comprises an input shaft 10, which in use would be connected to the motor 2 (not shown). The clutch 5 also comprises an output shaft 12 arranged co-axial with the input shaft 10. A thrust bearing 14 is disposed between input shaft 10 and output shaft 12 to support shaft 12 in co-axial arrangement and allows the shafts 10, 12 to rotate relative to each other.

Output shaft 12 has an output end 12a, which in use would be connected to the drum 7 (not shown) via gearing 6 (not shown) to allow the drive from motor 2 (not shown) to be transferred thereto.

Bearings 16a and 16b support input shaft 10 and may be connected to any suitable support structure to hold clutch 5 in place within the apparatus on which it is installed, such as a vehicle, for example an aircraft, for example a helicopter (not shown). It should be understood, however, that the winch 9 could be used other than on a vehicle, for example on a crane (whether stationary or mobile) or on a building.

A retaining ring 13 is positioned between the input shaft 10 and the output shaft 12 to retain thrust bearing 14.

The clutch 5 is used to transfer the rotation (drive) of the input shaft 10 to the output shaft 12.

As shown in FIG. 2, clutch 5 comprises input friction plates 20, operatively connected to the input shaft 10 via a ball-ramp assembly 24, and intervening output friction plates 22 attached to an output flange 23, which is attached to output shaft 12 for rotating therewith. While this embodiment uses six output friction plates and six input friction plates, any number of each plate could be used.

A backing plate 28 is slideably connected to output flange 23 at one end, and can be translated axially therealong. Input friction plates 20 are attached to the ball-ramp flange 26 of the ball-ramp assembly 24.

Figure 3:
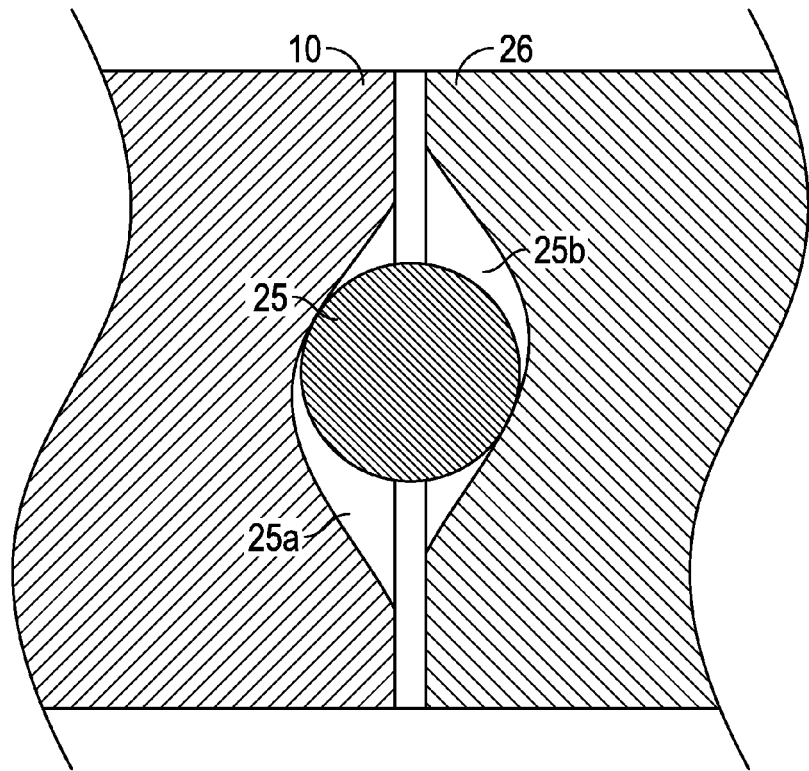
FIG. 3 is a part cross-sectional view of the ball-ramp assembly of the clutch of FIG. 2.

As shown in FIG. 3, which shows a part cross-sectional view taken along line 3-3 in FIG. 2, ball-ramp assembly 24 comprises a ball 25, which is held in a recess 25b at one end of flange 24 and in a recess 25a in input shaft 10. While only one ball 25 and pair of recesses 25a, 25b are shown, it is to be understood that any number of ball and recesses may be used within the scope of this disclosure. These balls and recesses may be held within one flange 26, representing one ball-ramp assembly 24 or may equally be provided with a plurality of flanges 26, representing one or more ball-ramp assemblies 24.

Thrust bearings 27a, 27b are disposed between the input shaft 10 and the output friction plates 22 and between the ball-ramp flange 26 and the backing plate 28, respectively. Thrust bearings 27a, 27b support the friction and backing plates 22, 28 and allow rotation thereof relative to the input shaft 10 and ball-ramp assembly 24, respectively.

The clutch 5 further comprises a spring pack 18 comprising three disc springs 18a, 18b, 18c also known as Belleville springs or washers. The spring pack 18 is connected to the output shaft 12 via spring pack flange 19, such that the spring pack 18 and the spring pack flange 19 rotate with the output shaft 12 (about axis X). Spring pack 18 contacts and biases backing plate 28 against thrust bearing 27b, which in turn biases input friction plates 20 into frictional engagement with output friction plates 22.

As will be understood by one skilled in the art, clutch 5 allows rotation of the input shaft 10 to be transferred to the output shaft 12 via the spring loaded engagement of the input friction plates 20 with the output friction plates 22. The maximum permitted amount of torque transferred from the input shaft 10 to the output shaft 12, and vice versa, can be controlled by adjusting the degree of spring loading, in order to change the frictional force exerted between output friction plates 22 and input friction plates 20.

It is to be understood that clutch 5 or at least some of its components (e.g. friction plates 20, 22 and/or ball-ramp assembly 24) may be sealed from the surroundings, for example, by seals and/or a housing surrounding the clutch 5 and/or the components (not shown). This is advantageous, as it means the clutch 5 of the present disclosure may be of a "wet-type", such that some or all of the components of clutch 5 are desirably immersed in a fluid, such as oil. Such wet-type clutches have advantages such as better lubrication and/or heat management, as would be apparent to one skilled in the art. It is to be understood, however, that the present disclosure is equally applicable to a "dry-type" clutch.

The function of ball-ramp assembly 24 will now be described in detail.

It is known that during operation of a clutch, such as the described clutch 5, the friction properties of friction plates 20, 22 (e.g. coefficient of friction) can vary greatly during use/over the operational life of the clutch 5. This friction property variation can cause unacceptable variations in the maximum permitted torque transfer between input shaft 10 and output shaft 12. This can lead to the clutch transmitting a torque that is above the predefined maximum permitted torque of the winch. This may lead to a dangerous overload of the winch, as previously described.

Ball-ramp assembly 24 is used to set a maximum transferred torque when operating the clutch 5. As described above, ball 25 engages the input shaft 10 and the ball-ramp flange 26 in opposing recesses 25a, 25b therein. As shown in FIG. 3, the recesses 25a, 25b are shaped to act as camming surfaces or ramps that cam against ball 25 and can cause it to roll circumferentially (i.e. in the direction of rotation of the shafts 10, 12) along (and partially axially out of) the recesses 25a, 25b. This movement of the ball 25 increases or decreases the separation between the input shaft 10 and ball-ramp flange 26.

For instance, when input shaft 10 and flange 26 are rotating (in a rotation direction R) at the same speed, below the predefined maximum transmitted torque setting of the clutch 5, ball 25 is held in the centre of recesses 25a, 25b and shaft 10 and flange 26 are at a minimum separation. Should the maximum transmitted torque setting be exceeded without the clutch 5 slipping, due to, e.g. a variation in the friction characteristics of the friction plates 20, 22 (as described above), then flange 26 will start to rotate at a different speed to shaft 10, causing the ball 25 to roll along recesses 25a, 25b and increase the separation between the shaft 10 and flange 26. This increase in separation causes the input friction plates 20 to push back on backing plate 28 in a direction opposing the spring loading action of spring pack 18 (i.e. to the right in FIG. 2). This reduces the tightness of the frictional engagement between friction plates 20, 22 which allows the clutch 5 to then subsequently slip in response the maximum transmitted torque setting being surpassed.

This prevents the maximum transmitted torque setting of the clutch 5 being exceeded, even if a variation in the friction characteristics of the plates 20, 22 would allow such torque to be transmitted.

Although the figures and the accompanying description describe particular embodiments, it is to be understood that the scope of this disclosure is not to be limited to such specific embodiments, and is, instead, to be determined by the following claims.

The invention claimed is:

1. A winch system comprising:
   a clutch for driving a winch, the clutch comprising:
      an input shaft for connection to a drive means and being operatively connected to at least one input friction plate to rotate therewith;
      an output shaft for driving the winch and being operatively connected to at least one output friction plate to rotate therewith;

a biasing means arranged to provide a biasing force that pushes the at least one input friction plate and the at least one output friction plate into contact with each other so that torque can be transferred from the input shaft to the output shaft via the input and output friction plates;

one or more ball-ramp assemblies positioned between the input shaft and the at least one input friction plate, wherein the clutch is a wet-type clutch; and at least one seal arranged to retain a fluid around at least one portion of the clutch;

a motor operatively connected to the input shaft; and a drum operatively connected to the output shaft.

2. The system of claim 1, wherein the one or more ball-ramp assemblies comprise:

a ball-ramp flange, disposed between the input shaft and the at least one input friction plate, and operatively connected to the at least one input friction plates; and a ball disposed between the ball-ramp flange and the input shaft, and held in opposing recesses therein, wherein the ball provides an axial separation between the ball-ramp flange and the input shaft.

3. The system of claim 2, wherein the recesses each comprise camming surfaces that are arranged to allow the separation between the input shaft and ball-ramp flange to be varied.

4. The system of claim 3, wherein the ball-ramp assembly is configured such that a predetermined relative torque between the input shaft and output shaft causes the ball to roll along the camming surfaces of the recesses and to increase the separation between the input shaft and the ball-ramp flange.

5. The system of claim 4, wherein the increase in separation between the input shaft and the ball-ramp flange opposes the biasing force between the at least one input friction plate and the at least one output friction plate.

6. The system of claim 1, wherein the biasing means comprises one or more springs.

7. The system of claim 6, wherein the one or more springs comprises one or more disc springs positioned around the output shaft.

8. The system of claim 1, wherein the at least one input friction plate comprises a plurality of input friction plates and the at least one output friction plate comprises a plurality of output plates.

9. The system of claim 1, wherein the retained fluid is oil.

10. The system of claim 1, wherein the at least one seal arranged is to retain the fluid around the at least input plate and the at least one output friction plate.

* * * * *